(12) United States Patent
Shimizu et al.

(10) Patent No.: US 10,133,223 B2
(45) Date of Patent: Nov. 20, 2018

(54) ANGLE ESTIMATOR, MOTOR CONTROLLER, MOTOR DRIVER, MOTOR DRIVING SYSTEM, IMAGE FORMING APPARATUS, AND CONVEYANCE DEVICE

(71) Applicants: Fumihiro Shimizu, Kanagawa (JP); Norihiro Yamamoto, Kanagawa (JP)

(72) Inventors: Fumihiro Shimizu, Kanagawa (JP); Norihiro Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/623,718

(22) Filed: Jun. 15, 2017

(65) Prior Publication Data
US 2017/0373617 A1    Dec. 28, 2017

(30) Foreign Application Priority Data

Jun. 24, 2016  (JP) .................................. 2016-125374

(51) Int. Cl.
*H02P 6/18*     (2016.01)
*G03G 15/00*    (2006.01)
*H02P 21/18*    (2016.01)

(52) U.S. Cl.
CPC ............. *G03G 15/50* (2013.01); *H02P 21/18* (2016.02)

(58) Field of Classification Search
None
See application file for complete search history.

(56) References Cited

U.S. PATENT DOCUMENTS

| 6,462,491 | B1 * | 10/2002 | Iijima ....................... H02P 9/18 |
| | | | 318/400.09 |
| 9,876,452 | B1 * | 1/2018 | Okubayashi ............ H02P 6/186 |
| 2007/0229021 | A1 * | 10/2007 | Yoshida ................. B62D 5/046 |
| | | | 318/807 |
| 2010/0117576 | A1 | 5/2010 | Shimizu |
| 2010/0188031 | A1 | 7/2010 | Shimizu |
| 2011/0089874 | A1 | 4/2011 | Shimizu |
| 2013/0106326 | A1 | 5/2013 | Kamatani et al. |
| 2013/0106327 | A1 | 5/2013 | Kamatani et al. |
| 2015/0064024 | A1 * | 3/2015 | Moriyama .......... F04D 27/0261 |
| | | | 417/44.1 |

FOREIGN PATENT DOCUMENTS

| JP | 2002-291283 | 10/2002 |
| JP | 2008-301695 | 12/2008 |

OTHER PUBLICATIONS

Shinji Ichikawa, et al., "Sensorless Controls of Salient-Pole Permanent Magnet Synchronous Motors Using Extended Electromotive Force Models" T.IEE Japan, 2002, vol. 122-D, No. 12, pp. 1088-1096.

(Continued)

*Primary Examiner* — Bentsu Ro
(74) *Attorney, Agent, or Firm* — Harness, Dickey & Pierce, P.L.C.

(57) ABSTRACT

An angle estimator includes correction means for correcting a phase of an error parameter to obtain a corrected error parameter and estimation means for calculating an estimated speed and an estimated angle of the motor based on the corrected error parameter. The error parameter is a function of an angle error representing a difference between an actual angle and an estimated angle of a motor.

20 Claims, 10 Drawing Sheets

(56) References Cited

OTHER PUBLICATIONS

Matthew J. Corley, et al., "Rotor Position and Velocity Estimation for a Salient-Pole Permanent Magnet Synchronous Machine at Standstill and High Speeds" IEEE Transactions on Industry Applications, Jul./Aug. 1998, vol. 34, No. 4, pp. 784-789.

* cited by examiner

ANGLE ESTIMATOR, MOTOR CONTROLLER, MOTOR DRIVER, MOTOR DRIVING SYSTEM, IMAGE FORMING APPARATUS, AND CONVEYANCE DEVICE

CROSS-REFERENCE TO RELATED APPLICATIONS

This patent application is based on and claims priority pursuant to 35 U.S.C. § 119(a) to Japanese Patent Application No. 2016-125374, filed on Jun. 24, 2016, in the Japan Patent Office, the entire disclosure of which is hereby incorporated by reference herein.

BACKGROUND

Technical Field

Embodiments of the present disclosure relate to an angle estimator, a motor controller, a motor driver, a motor driving system, an image forming apparatus, and a conveyance device.

Description of the Related Art

A motor controller to control a motor by sensorless control estimates an angle (position) of a rotator, and controls the motor based on an estimated rotator angle. There are estimation methods using an induced voltage for high speed driving and estimation methods using a harmonic signal for low speed driving, for angle estimation. In each of such methods, in order to control the motor accurately, it is preferable to estimate an actual angle θre of the rotator with high accuracy.

To estimate the actual angle θre of the rotator, there are methods to make an angle error θerr, which is the difference between the estimated rotator angle θest and the actual angle θre, close to zero by a proportional control (P control) or a proportional integral control (PI control). In such methods, since the actual angle θre is not directly measured, the error parameter Xerr is used instead of the angle error θre. The error parameter Xerr is some kind of a parameter considered to be proportional to the angle error θerr in the vicinity of zero. When the calculated estimated rotator angle θest is calculated so that the error parameter Xerr approaches zero, the accuracy of estimation of the angle can be high.

SUMMARY

According to an embodiment of this disclosure, an angle estimator includes correction means for correcting a phase of an error parameter to obtain a corrected error parameter and estimation means for calculating an estimated speed and an estimated angle of the motor based on the corrected error parameter. The error parameter is a function of an angle error representing a difference between an actual angle and an estimated angle of a motor.

In another embodiment, a motor controller includes the angle estimator described above and a controller configured to calculate a voltage command value so that the estimated speed accords with the speed command value.

In yet another embodiment, a motor driver includes the motor controller described above; an inverter configured to supply electrical current according to the voltage command value to the motor, and a current detector configured to detect a value of the electrical current supplied to the motor.

In yet another embodiment, a motor driving system includes the motor driver described above, and the motor described above.

In yet another embodiment, an image forming apparatus includes an image forming device to form an image on a sheet, a conveyance roller to convey the sheet, and the motor driving system described above.

In yet another embodiment, a conveyance device includes a conveyance roller to convey a sheet, and the motor driving system described above.

In yet another embodiment, an angle estimator includes circuitry configured to correct a phase of an error parameter to obtain a corrected error parameter and calculate an estimated speed and an estimated angle of the motor based on the corrected error parameter. The error parameter is a function of an angle error representing a difference between an actual angle of a motor and an estimated angle of the motor.

In yet another embodiment, an angle estimating method includes correcting a phase of an error parameter to obtain a corrected error parameter, and calculating an estimated speed and an estimated angle of the motor based on the corrected error parameter. The error parameter is a function of an angle error representing a difference between an actual angle of a motor and an estimated angle of the motor.

In yet another embodiment, a motor controlling method includes the above described angle estimating method and calculating a voltage command value to make the estimated speed accord with a speed command value instructing a speed of the motor. The voltage command value instructs a value of voltage to drive the motor.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

Figure 1:
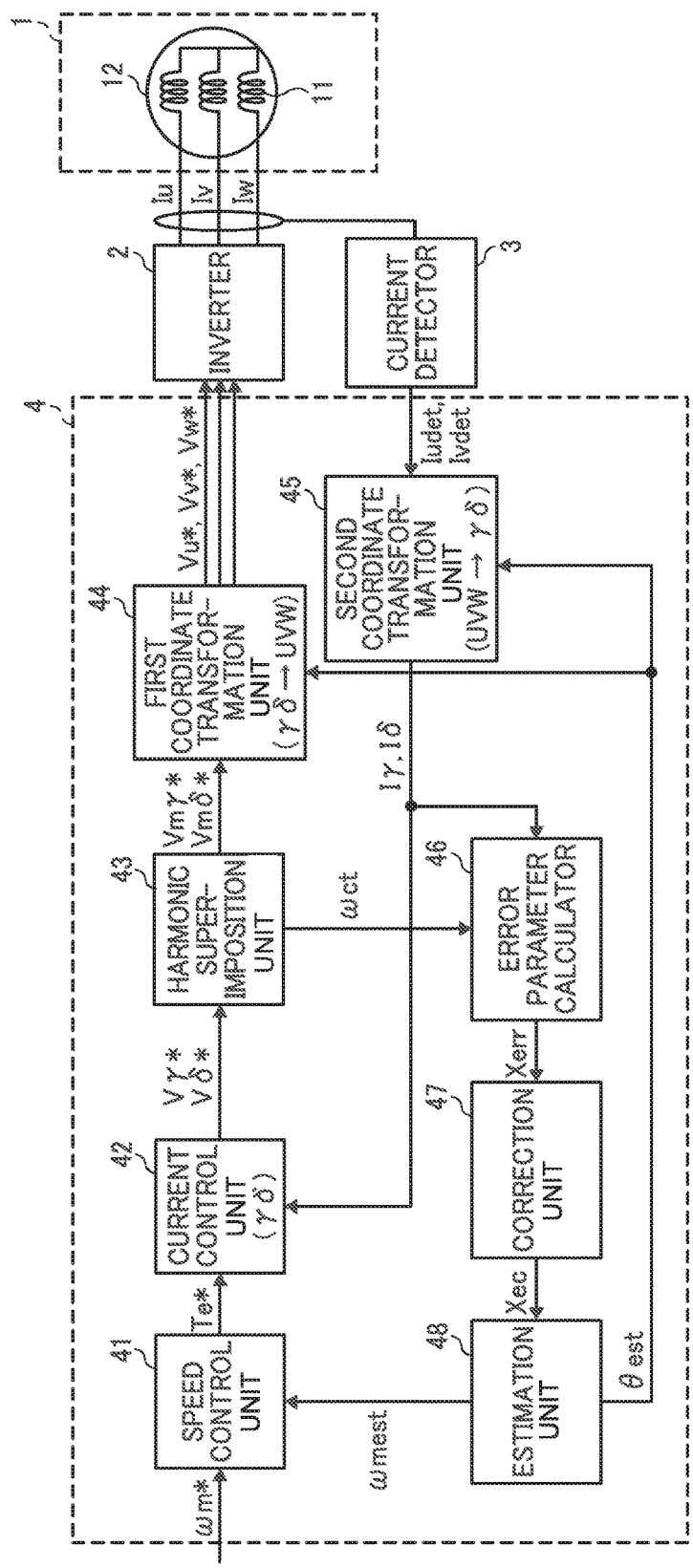
FIG. 1 is a schematic block diagram illustrating a configuration of a motor driving system according to a first embodiment of the present invention.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, a motor driving system according to an embodiment of the present invention is described. As used herein, the singular forms "a", "an", and "the" are intended to include the plural forms as well, unless the context clearly indicates otherwise. The motor driving system according to the embodiment described below drives a brushless direct current (DC) motor.

The inventors recognize that, in sensorless motor control, depending on characteristics of the motor or driving conditions of the motor, the error parameter Xerr fluctuates and becomes disproportional to the angle error θerr in the vicinity of zero. Fluctuations in the error parameter Xerr cause an error in the estimated rotator angle θest, and accuracy in estimating the angle of the rotator is degraded.

FIG. 1 is a schematic block diagram illustrating a configuration of the motor driving system according to the present embodiment. The motor driving system in FIG. 1 includes a motor 1, an inverter 2, a current detector 3, and a motor controller 4. The inverter 2, the current detector 3, and the motor controller 4 together form a motor driver to drive the motor 1.

The motor 1 is a three-phase brushless DC motor. Respective phases of the motor 1 are called as a phase U, a phase V, and a phase W. The motor 1 includes a three-phase coil 11 (stator) and a rotator 12. The rotator 12 includes a permanent magnet having south poles and north poles disposed alternatively, and the number of bipolar pairs (pairs of a south pole and a north pole) is p.

In the description below, the angle which corresponds to one round of the rotator 12 is referred to as a mechanical angle (one cycle of the mechanical angle is equal to one round of the rotator 12). An angle which makes p cycles while the rotator 12 makes one round is referred to as an electrical angle. The electrical angle is p times greater than the mechanical angle. Hereinafter, the angle (position) and speed (angular speed) of the rotator 12 are presented in electrical angle unless otherwise noted.

The motor 1 is driven by a current supplied from the inverter 2. More specifically, currents Iu, Iv, and Iw are supplied from the inverter 2 to a U-phase coil, a V-phase coil, and a W-phase coil of the coil 11 in the motor 1, respectively. The rotator 12 in the motor 1 rotates according to a magnetic field generated by the U-phase coil, the V-phase coil, and the W-phase coil of the coil 11 in response to the currents Iu, Iv, and Iw.

The inverter 2 supplies the motor 1 with the currents Iu, Iv, and Iw according to voltage command values Vu*, Vv*, and Vw* output by the motor controller 4, thereby driving the motor 1. Hereinafter, values with index "*" denote the command values (control values). The voltage command values Vu*, Vv*, and Vw* are applied to the U phase coil, the V phase coil, and the W phase coil of the coil 11, respectively.

Figure 2:
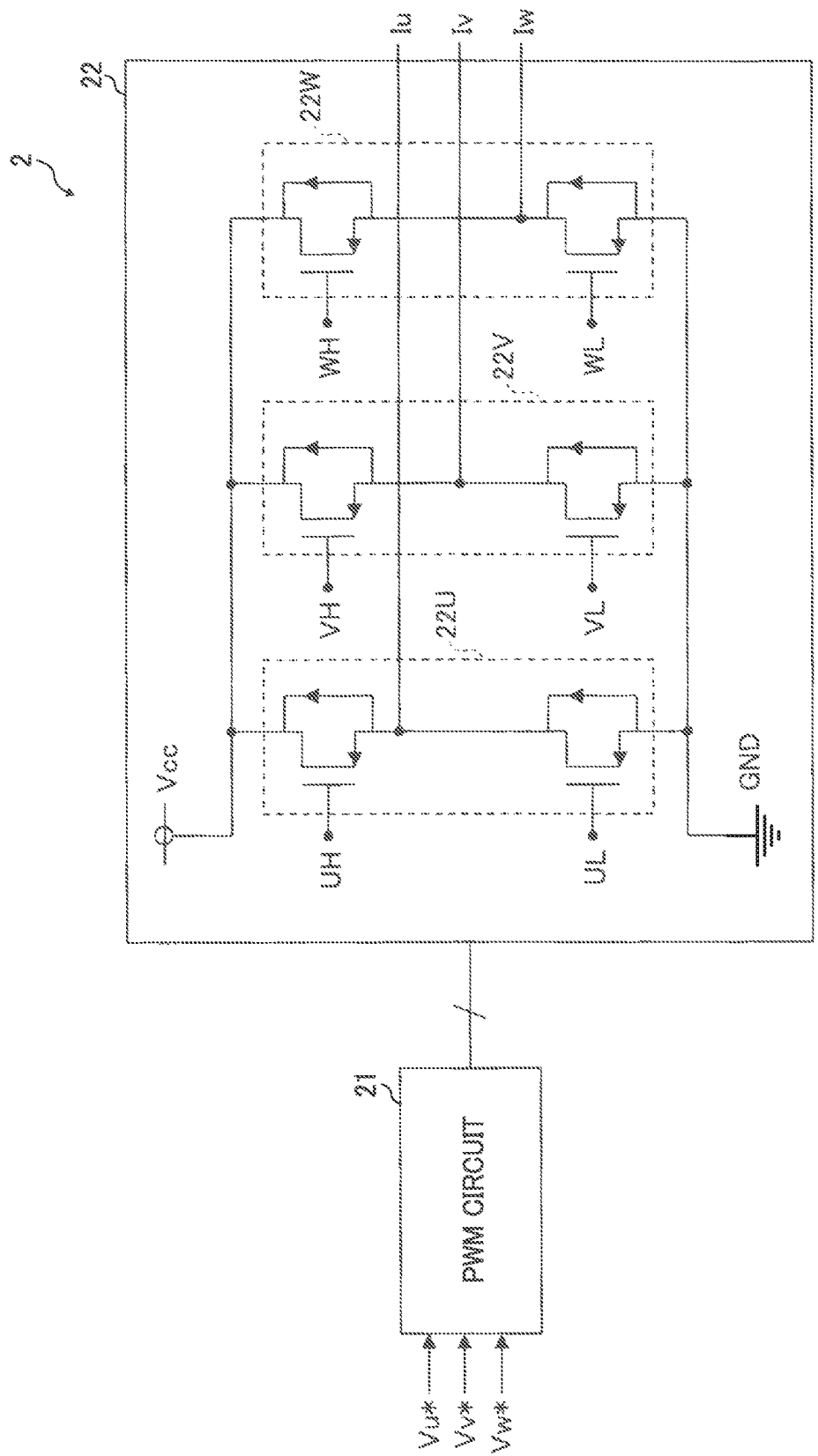
FIG. 2 is a diagram of circuitry of an inverter in the motor driving system illustrated in FIG. 1.

FIG. 2 is a diagram of circuitry of the inverter 2. The inverter 2 in FIG. 2 includes a pulse-width modulation (PWM) circuit 21 and a driving circuit 22.

The PWM circuit 21 performs pulse-width modulation of the voltage command value Vu*, and generates and outputs gating signals (UH and UL) for U phase. The PWM circuit 21 performs pulse-width modulation of the voltage command value Vv*, and generates and outputs gating signals (VH and VL) for V phase. The PWM circuit 21 performs pulse-width modulation of the voltage command value Vw*, and generates and outputs gating signals (WH and WL) for W phase. In a case illustrated in FIG. 2, the gating signal can be either a high voltage signal or a low voltage signal. The gating signal is output from PWM circuit 21 and input to the driving circuit 22.

The driving circuit 22 includes a driving circuit 22U of U phase, a driving circuit 22V of V phase, and a driving circuit 22W of W phase. The driving circuit 22U of U phase includes a power source, an output terminal, a ground wire (GND), a switching element connected between the power source and the output terminal, and a switching element connected between the output terminal and the ground wire (GND), and diodes connected in parallel to the respective switching elements. In the case illustrated in FIG. 2, the switching elements are metal-oxide semiconductor field-effect transistors (MOSFET). Alternatively, bipolar transistors can also be used.

The output terminal of the driving circuit 22U is connected to the U-phase coil of the coil 11. The gating signal for U phase, which is output from the PWM circuit 21, is input to each of the switching elements in the driving circuit U22. As the switching element turns on and off in response to the input gating signal, the current Iu according the voltage command value Vu* is supplied to the U-phase coil of the coil 11.

As the configurations of the driving circuits 22V and 22W are similar to configuration of the driving circuit 22U, descriptions thereof are omitted. The inverter 2 is not limited to the configuration illustrated in FIG. 2. Any circuit which supplies the currents Iu, Iv, and Iw according to the voltage command values Vu*, Vv*, and Vw*, respectively, can be used as the inverter 2.

The current detector 3 detects and outputs at least two of current values of the currents Iu, Iv, and Iw supplied to the motor 1. In the description below, the current detector 3 detects current values Iudet and Ivdet of the currents Iu and Iv. The current values Iudet and Ivdet detected by the current detector 3 are input to the motor controller 4.

Figure 3:
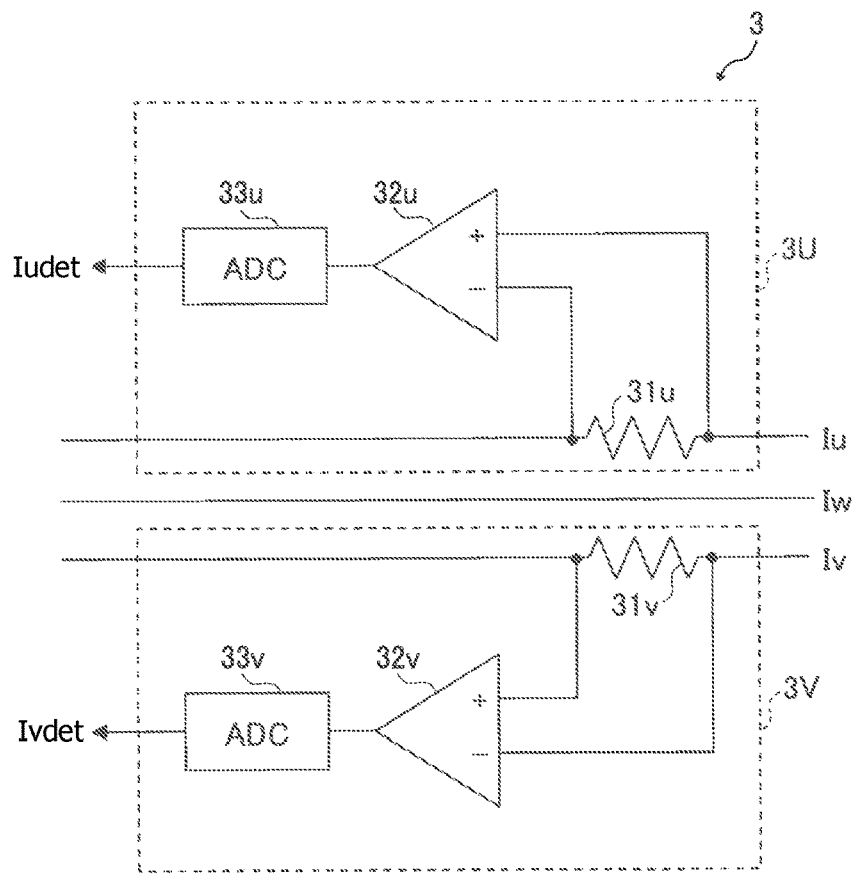
FIG. 3 is a diagram of example circuitry of a current detector in the motor driving system illustrated in FIG. 1.

FIG. 3 is a diagram of an example circuitry of the current detector 3. The current detector 3 illustrated in FIG. 3 includes a U-phase current detector 3U and a V-phase current detector 3V. The U-phase current detector 3U includes a shunt resistor 31u, a differential amplifier 32u, and an analog to digital (AD) convertor 33u (represented by "ADC" in FIG. 3). Similar to the U-phase current detector 3U, the V-phase current detector 3V includes a shunt resistor 31v, a differential amplifier 32v, and an AD convertor 33v.

The shunt resistor 31u is connected between the output terminal of the driving circuit 22U and the U phase coil of the coil 11. As the driving circuit 22U supplies the current Iu to the coil 11, the current Iu flows through the shunt resistor 31u, and a voltage drop is generated in response to a resistance value of the shunt resistor 31u.

Differential input terminals of the differential amplifier 32u are connected to both ends of the shunt resistor 31u. The differential amplifier 32u amplifies the voltage drop (voltage difference between the both ends of the shunt resistor 31u) generated in the shunt resistor 31u at a predetermined gain, and outputs an amplified output signal.

The AD convertor 33u converts the output signal of the differential amplifier 32u into a digital value and output the digital value. This digital value is input to the motor controller 4 as the current value Iudet.

As the configuration of the V-phase current detector 3V is similar to the configuration of the U-phase current detector 3U, descriptions thereof are omitted. The current detector 3 is not limited to the configuration illustrated in FIG. 3. Any circuit which detects the current values Iudet, and Ivdet can be used as the current detector 3.

The motor controller 4 includes a processor and a memory. The processor can be a central processing unit (CPU), a micro processing unit (MPU), or a digital signal processor (DSP). The processor can also be an application specific integrated circuit (ASIC), a field programmable gate array (FPGA), or a programmable logic device (PLD). The processor runs a program stored in the memory.

The memory can be a dynamic random access memory (DRAM), a static RAM (SRAM), a magnetic RAM (MRAM), or a flash memory. The memory stores the program the processor runs.

The motor controller 4 can include one processor and one memory. Alternatively, The motor controller 4 can include a plurality of processors and a plurality of memories. The motor controller 4 is implemented by an integrated circuit (IC) chip, for instance. In this case, the IC chip can include at least one of the inverter 2 and the current detector 3.

The motor controller 4 calculates and outputs the voltage command values Vu*, Vv*, and Vw* based on a speed command value ωm*. The speed command value ωm* is an instructed value of the speed (angular speed) of the rotator 12. The speed command value ωm* is presented in the mechanical angle, and is input from outside (e.g. an upper application). The speed command value ωm* can be predetermined. The voltage command values Vu*, Vv*, and Vw* output by the motor controller 4 are input to the inverter 2.

As illustrated in FIG. 1, a functional configuration of the motor controller 4 includes a speed control unit 41, a current control unit 42, a harmonic superimposition unit 43, a first coordinate transformation unit 44, a second coordinate transformation unit 45, an error parameter calculator 46, a correction unit 47 (correction means), and an estimation unit 48 (estimation means). These functional elements are implemented by the program executed by the processor. The speed control unit 41 and the current control unit 42 together serve as control means. In the present embodiment, the harmonic superimposition unit 43, the error parameter calculator 46, the correction unit 47, and the estimation unit 48 form an angle estimator to estimate an angle of the motor 1.

The speed control unit 41 calculates and outputs a torque command value Te* based on the speed command value ωm* and an estimated speed ωmest. The estimated speed ωmest is the estimation value of the speed of the rotator 12 expressed as the mechanical angle, and input from the estimation unit 48. The torque command value Te* is the command value of torque to be generated by the motor 1. The speed control unit 41 outputs the torque command value Te* so that the estimated speed ωmest accords with the speed command value ωm* by proportional control (P control) or proportional-integral control (PI control). The torque command value Te* output by the speed control unit 41 is input to the current control unit 42.

The current control unit 42 calculates and outputs the voltage command values Vγ* and Vδ* based on the torque command value Te* and current values Iγ and Iδ. The current value Iγ is a measured value of a γ-axis component (γ-axis current) of the current supplied to the motor 1. The current value Iδ is a measured value of a δ-axis component (δ-axis current) of the current supplied to the motor 1. The current command value Vγ* is the command values of a γ-axis component (γ-axis voltage) of the voltage applied to the motor 1. The current command value Vδ* is the command values of a δ-axis component (δ-axis voltage) of the voltage applied to the motor 1. A δγ coordinate system is described in further detail later. The voltage command values Vγ* and Vδ* output by the current control unit 42 are input to the harmonic superimposition unit 43. The current control unit 42 includes a calculation unit to calculate current command values and a proportional-integral control unit.

The calculation unit calculates current command values Iγ* and Iδ* based on the torque command value Te*. The current command value Iγ* is the command value of a γ-axis component (a γ-axis current) of the current applied to the motor 1. The current command value Iδ* is the command value of a δ-axis component (δ-axis current) of the current applied to the motor 1. The calculation unit calculates the current command values Iγ* and Iδ* so that a torque value given to the motor 1 accords with the torque command value Te*.

The proportional-integral control unit calculates and outputs the voltage command values Vγ* and Vδ* based on the current command values Iγ* and Iδ*, calculated by the calculation unit, and current values Iγ and Iδ. The proportional-integral control unit calculates the voltage command values Vγ* and Vδ* so that the current values Iγ and Iδ accord with the current command values Iγ* and Iδ* by P control or PI control.

The harmonic superimposition unit 43 superimposes a harmonic voltage on a voltage applied to the motor 1 to estimate an angle error of the rotator 12.

Figure 4:
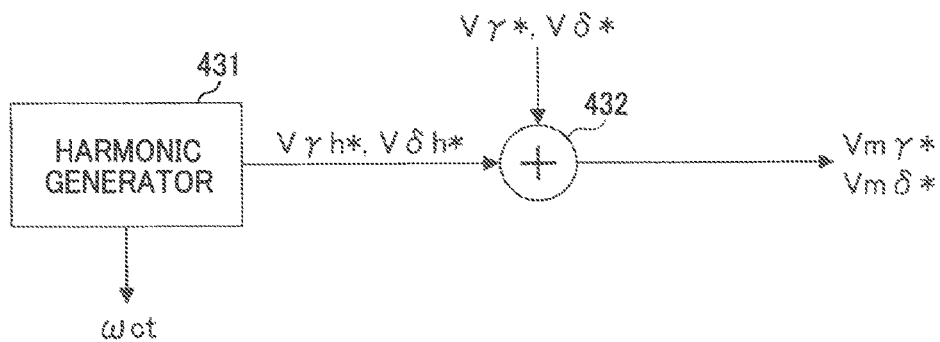
FIG. 4 is a schematic block diagram of an example of a harmonic superimposition unit in the motor driving system illustrated in FIG. 1.

FIG. 4 is a schematic block diagram of an example of the harmonic superimposition unit 43. The harmonic superimposition unit 43 illustrated in FIG. 4 includes a harmonic generator 431 and an adder 432.

The harmonic generator 431 generates the harmonic voltage. The harmonic generator 431 calculates and outputs harmonic command values Vγh* and Vδh*. The harmonic command value Vγh* is the command value of a γ-axis component of the harmonic voltage superimposed on the voltage applied to the motor 1. The harmonic command value Vδh* is the command value of a δ-axis component of the harmonic voltage superimposed on the voltage applied to the motor 1. When the harmonic voltage is a sine wave, the harmonic command values Vγh* and Vδh* are expressed by the following equation, for instance.

$$\begin{bmatrix} V\gamma h* \\ V\delta h* \end{bmatrix} = \begin{bmatrix} Vhf \cdot \cos \omega ct \\ 0 \end{bmatrix} \qquad \text{Equation 1}$$

In Equation 1, Vhf represents an amplitude of the harmonic voltage, $\omega c$ represents an angular speed of the harmonic voltage, and t represents time. The harmonic command value $V\gamma h^*$ is equivalent to the amplitude of harmonic voltage at time t. The harmonic command value $V\delta h^*$ is equal to zero.

The amplitude Vhf and the angular speed $\omega c$ are predetermined. The angular speed $\omega c$ is set larger than the speed (angular speed) of the rotor 12 sufficiently. The speed of the rotor 12 is equivalent to an angular speed of a basic wave component of the voltage applied to the coil 11. The harmonic generator 431 calculates and outputs a phase $\omega c t$ which is the angular speed $\omega c$ multiplied by the time t. The phase $\omega c t$ output by the harmonic generator 431 is input to the error parameter calculator 46.

The adder 432 calculates and outputs a voltage command value $Vm\gamma^*$ which is a sum of the harmonic command value $V\gamma h^*$ and the voltage command value $V\gamma^*$. The adder 432 calculates and outputs a voltage command value $Vm\delta^*$ which is a sum of the harmonic command value $V\delta h^*$ and the voltage command value $V\delta^*$. The voltage command values $Vm\gamma^*$ and $Vm\delta^*$ output by the adder 432 are input to the first coordinate transformation unit 44.

The first coordinate transformation unit 44 transforms the $\gamma\delta$ coordinate system to a UVW coordinate system based on an estimated rotator angle $\theta est$. The estimated rotator angle $\theta est$ is an estimation value of the angle of the rotor 12. The first coordinate transformation unit 44 performs the coordinate transformation on the voltage command values $Vm\gamma^*$ and $Vm\delta^*$ to calculate and output the voltage command values $Vu^*$, $Vv^*$, and $Vw^*$. The voltage command values $Vu^*$, $Vv^*$, and $Vw^*$ output by the first coordinate transformation unit 44 are input to the inverter 2.

The second coordinate transformation unit 45 transforms the UVW coordinate system to the $\gamma\delta$ coordinate system based on the estimated rotator angle $\theta est$. The second coordinate transformation unit 45 performs the coordinate transformation on the current values Iu, Iv, and Iw to calculate and output the current values $I\gamma$ and $I\delta$. The current values $I\gamma$ and $I\delta$ output by the second coordinate transformation unit 45 are input to the current control unit 42 and the error parameter calculator 46.

Figure 5:
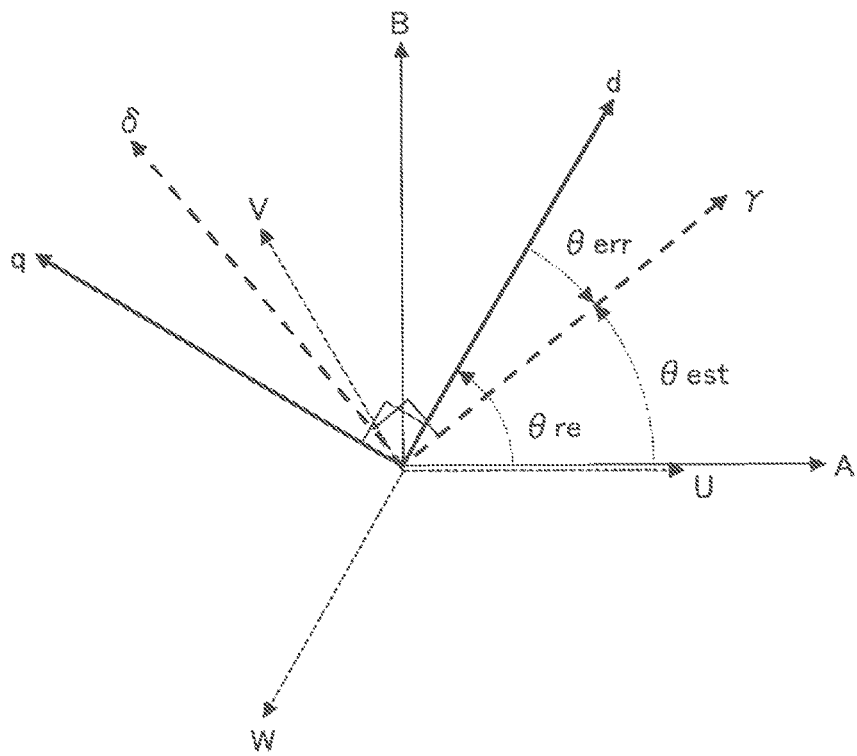
FIG. 5 is a schematic chart illustrating a coordinate system to control the motor.

FIG. 5 is a schematic chart illustrating a coordinate system to control the motor 1. In FIG. 5, a solid line denotes an AB coordinate system, a dotted line denotes a UVW coordinate system, a bold line donates a dq coordinate system, and a broken line denotes a $\theta\delta$ coordinate system. The original point in FIG. 5 is common to those coordinate systems.

The AB coordinate system is a fixed coordinate system having an A-axis and a B-axis orthogonal to each other. The AB coordinate system is used in a second embodiment.

The UVW coordinate system is a fixed coordinate system having a U-axis, a V-axis, and a W-axis different in phase by 120 degrees with each other. In the case illustrated in FIG. 5, the U-axis and the A-axis are in the same phase. The U-axis, the V-axis, and the W-axis correspond to the U-phase, the V-phase, and the W-phase of the motor 1, respectively.

The dq coordinate system is a rotating coordinate system having a d-axis and a q-axis orthogonal to each other. An angle of the d-axis relative to the U-axis (A-axis) is equivalent to an actual angle of the rotor 12 (i.e., an actual rotator angle $\theta re$). That is, the dq coordinate system is based on an actual angle position of the rotor 12.

The motor driving system with a sensor to measure the angle of the rotator 12 controls the motor 1 based on the angle (i.e., the actual rotator angle $\theta re$) measured by the sensor. However, when the motor 1 is controlled in sensorless control, the actual rotator angle $\theta re$ is not measured directly. Thus, in the present embodiment, the motor controller 4 estimates the rotator angle, and controls the motor 1 based on the estimated angle of the rotor 12 (i.e., estimated rotator angle $\theta est$).

The $\gamma\delta$ coordinate system is a rotating coordinate system having a $\gamma$-axis and a $\delta$-axis orthogonal to each other. An angle of the $\gamma$-axis relative to the U-axis (A-axis) is equivalent to the estimated rotator angle $\theta est$ which is an actual angle of the rotor 12. The $\gamma\delta$ coordinate system is based on the estimated angle position of the rotor 12. The difference between the actual rotator angle $\theta re$ and the estimated rotator angle $\theta est$ is the angle error $\theta err$.

Using the estimated rotator angle $\theta est$, a transformation matrix C, which performs a coordinate transformation from the UVW coordinate system to the $\gamma\delta$ coordinate system, is expressed by the following equation.

$$C = \sqrt{\frac{2}{3}} \begin{bmatrix} \cos(\theta est) & \cos\left(\theta est - \frac{2\pi}{3}\right) & \cos\left(\theta est + \frac{2\pi}{3}\right) \\ -\sin(\theta est) & -\sin\left(\theta est - \frac{2\pi}{3}\right) & -\sin\left(\theta est + \frac{2\pi}{3}\right) \end{bmatrix} \quad \text{Equation 2}$$

The first coordinate transformation unit 44 calculates the voltage command values $Vu^*$, $Vv^*$, and $Vw^*$ by the following equation using the transformation matrix C.

$$\begin{bmatrix} Vu* \\ Vv* \\ Vw* \end{bmatrix} = C^T \begin{bmatrix} Vm\gamma* \\ Vm\delta* \end{bmatrix} \quad \text{Equation 3}$$

The second coordinate transformation unit 45 calculates the current value Iw based on the current values Iu and Iv (Iw=−Ic−Iv), and calculates the current values $I\gamma$ and $I\delta$ by the following equation using the transformation matrix C.

$$\begin{bmatrix} I\gamma \\ I\delta \end{bmatrix} = C \begin{bmatrix} Iu \\ Iv \\ Iw \end{bmatrix} \quad \text{Equation 4}$$

The error parameter calculator 46 extracts a harmonic current from the current flowing through the coil 11, and outputs an error component included in the harmonic current as an error parameter Xerr. The harmonic current is a current component (harmonic component) corresponding the harmonic voltage.

Figure 6:
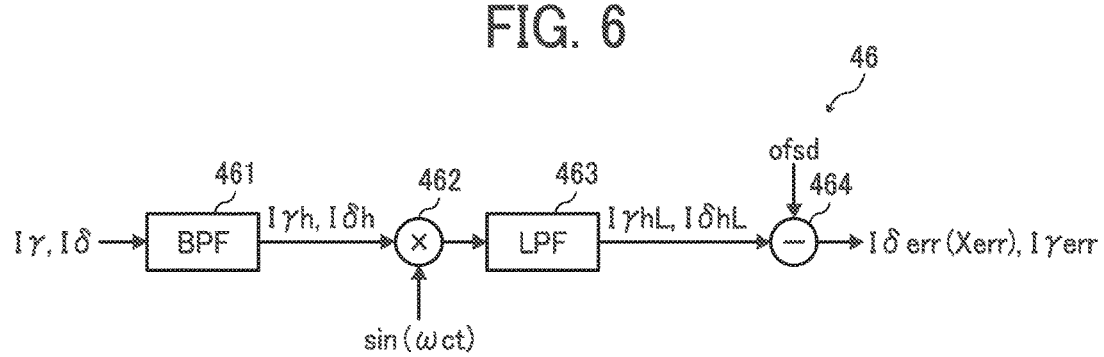
FIG. 6 is a schematic block diagram of an example of an error parameter calculator in the motor driving system illustrated in FIG. 1.

FIG. 6 is a schematic block diagram of an example of the error parameter calculator 46. The error parameter calculator 46 illustrated in FIG. 6 includes a band pass filter (BPF) 461, a multiplication unit 462, a low pass filter (LPF) 463, and a subtraction unit 464.

The BPF 461 is a filter that allows a predetermined band including a frequency corresponding the angle speed $\omega c$, to pass therethrough, and attenuates other bands. The BPF 461 removes a fundamental wave component and extracts a harmonic component from the current value $I\gamma$ and $I\delta$, and outputs harmonic current values $I\gamma h$ and $I\delta h$. The harmonic current value $I\gamma h$ is a current value of a $\gamma$-axis component of the harmonic current. The harmonic current value $I\delta h$ is a current value of a δ-axis component of the harmonic current. The harmonic current values Iγh and Iδh output by the BPF 461 are input to the multiplication unit 462. In general, the harmonic current values Iγh and Iδh are approximated by the following equation because the voltage drop made by the harmonic current in the motor 1 is small.

$$\begin{bmatrix} I\gamma h \\ I\delta h \end{bmatrix} = kc \cdot \sin(\omega ct) \cdot \left\{ L0 \begin{bmatrix} 1 \\ 0 \end{bmatrix} + L1 \begin{bmatrix} -\cos(2\theta err + \Delta\theta err) \\ \sin(2\theta err + \Delta\theta err) \end{bmatrix} \right\} \quad \text{Equation 5}$$

In Equation 5, Kc is a constant determined by a motor characteristic or a system specification, and L0 and L1 are constants determined by an inductance of the coil 11. As described above, the angle error θerr is the angle error equivalent to the difference between the actual rotator angle θre and the estimated rotator angle θest. On the other hand, Δθerr is an angle error generated by characteristics or a driving condition of the motor 1.

The multiplication unit 462 is a mixer to multiply the harmonic current by a sine wave sin (ωct). The multiplication unit 462 outputs values calculated by multiplying the harmonic current Iγh and Iδh by sin (ωct). When the harmonic current is multiplied by a sine wave having the phase ωct, an offset corresponding to the error component is generated in a low frequency. The error component is a current component corresponding to the angle error θerr and Δθerr, contained in the harmonic current. The values output by the multiplication unit 462 are input to the LPF 463.

The LPF 463 is a filter that allows the low frequency to pass therethrough, and attenuates a high frequency including the frequency corresponding the angle speed ωc. The LPF 463 extracts the low frequency component the above-mentioned error component, contained in the harmonic current, and outputs low frequency current values IγhL and IδhL. The low frequency current values IγhL and IδhL output by the LPF 463 are input to the subtraction unit 464. The low frequency current values IγhL and IδhL are expressed by the following equation.

$$\begin{bmatrix} I\gamma hL \\ I\delta hL \end{bmatrix} = kc \cdot \left\{ L0 \begin{bmatrix} 1 \\ 0 \end{bmatrix} + L1 \begin{bmatrix} -\cos(2\theta err + \Delta\theta err) \\ \sin(2\theta err + \Delta\theta err) \end{bmatrix} \right\} \quad \text{Equation 6}$$

The subtraction unit 464 subtracts an offset component ofsd from the low frequency current values IγhL and IδhL to calculate error currents Iγerr and Iδerr. The offset component ofsd is an offset component that occurs according to the motor characteristic, the system specification, and the inductance of the coil 11. The error current value Iγerr is a current value of a γ-axis component of the error component (error current) in the current generated due to the angle error θerr and the angle error Δθerr. The error current value Iγerr is a current value of a δ-axis component of the error component (error current) in the current generated due to the angle errors θerr and Δδerr. The offset component ofsd is expressed by the following equation.

$$ofsd = \frac{kc \cdot L0}{2} \begin{bmatrix} 1 \\ 0 \end{bmatrix} \quad \text{Equation 7}$$

Using the offset component ofsd in Equation 7, the error current values Iγerr and Iδerr are calculated by the following equation.

$$\begin{bmatrix} I\gamma err \\ I\delta err \end{bmatrix} = \begin{bmatrix} I\gamma hL \\ I\delta hL \end{bmatrix} - ofsd \cong \frac{kc \cdot L1}{2} \begin{bmatrix} -\cos(2\theta err + \Delta\theta err) \\ \sin(2\theta err + \Delta\theta err) \end{bmatrix} \quad \text{Equation 8}$$

The subtraction unit 464 outputs the error current values Iγerr and Iδerr obtained in this manner. In the present embodiment, the error current value Iδerr corresponds to an error parameter Xerr. The error current values Iγerr and Iδerr (Xerr) output by the subtraction unit 464 are input to the correction unit 47.

Figure 7:
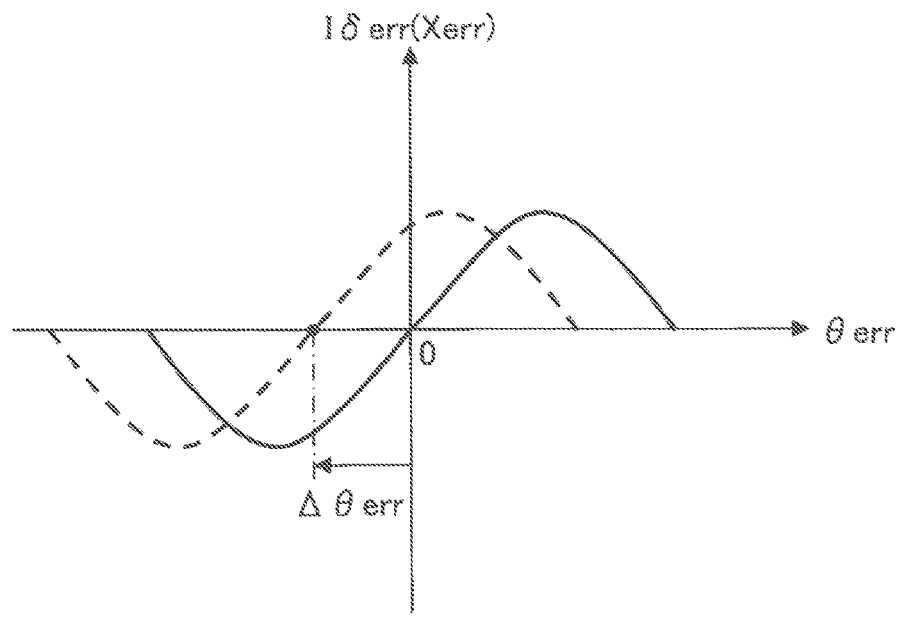
FIG. 7 is a graph of an example of an error current value Iδerr.

FIG. 7 is a graph of an example of the error current value Iδerr serving as the error parameter Xerr. In FIG. 7, a solid line denotes the error current value Iδerr when the angle error Δθerr is zero, and a broken line denotes the error current value Iδerr when the angle error Δθerr is not zero.

As illustrated in FIG. 7, when the angle error Δθerr is zero, the error current value Iδerr is a sine function whose zero-cross point (value of the angle error θerr at which the error current value Iδerr is zero) coincides with a horizontal coordinate (representing the angle error Δθerr) being zero. Therefore, the error current value Iδerr is considered proportional to the angle error θerr in a vicinity of zero (in a predetermined range in which the angle error θerr is close to zero).

In the case where the angle error Δθerr is zero, approximating the error current value Iδerr to zero is equivalent to approximating the angle error θerr to zero. Therefore, the estimated rotator angle θest can be approximated to the actual rotator angle θre by calculating the estimated rotator angle θest such that the error current value Iδerr is made close to zero. For this reason, the error current value Iδerr can be used as the error parameter Xerr.

However, in the case where the angle error Δθerr is not zero, the phase of the angle error Δθerr varies by the angle error Δθerr, and the zero-cross point deviates from zero as illustrated in FIG. 7. In this case, the error current value Iδerr is not considered approximately proportional to the angle error θerr in the vicinity of zero.

In the case where the angle error Δθerr is not zero, approximating the error current value Iδerr to zero does not necessarily correspond to approximating the angle error θerr to zero as illustrated in FIG. 7. If the error current value Iδerr like this is used as the error parameter Xerr, an estimation accuracy of the actual rotator angle θre is lowered. In the present embodiment, the phase of the error current value Iδerr (error parameter Xerr) is corrected according to the angle error Δθerr.

The correction unit 47 corrects a phase of the error parameter Xerr by a predetermined phase-corrected amount Δθph. The error parameter Xerr corrected in phase is referred as a corrected error parameter Xec. The correction unit 47 outputs the corrected error parameter Xec. The corrected error parameter Xec output by the correction unit 47 is input to the estimation unit 48.

The phase-corrected amount Δθph is preferably set to be equal to the angle error Δθerr. Such setting of the phase-corrected amount Δθph is possible when a table or a function representing a relation among the current values Iγ and Iδ, the estimated rotator angle θest, and the angle error Δθerr is used. The table or the function described above can be prepared based on data on the angle error Δθerr obtained by an experiment using an angle sensor, or by using a magnetic simulation.

For example, descriptions are given below of a case where the table of the relation between the angle error Δθerr and the estimated rotator angle θest is prepared. In this case, the correction unit 47 may obtain the estimated rotator angle θest from the estimation unit 48, and may select the angle error Δθerr corresponding to the estimated rotator angle θest, as the phase-corrected amount Δθph.

In the present embodiment, the error parameter Xerr is the error current value Iδerr. Therefore, when the phase-corrected amount Δθph is sufficiently close to the angle error Δθerr, the corrected error parameter Xec is expressed by the following equation.

$$Xec = \begin{bmatrix} \sin(\Delta\theta ph) \\ \cos(\Delta\theta ph) \end{bmatrix}^T \begin{bmatrix} I\gamma err \\ I\delta err \end{bmatrix} \cong \frac{kc \cdot L1}{2}\sin(2\theta err) \quad \text{Equation 9}$$

As expressed in Equations 8 and 9, the corrected error parameter Xec is equivalent to the error parameter Xerr shifted in phase by the angle error Δθerr.

Figure 8:
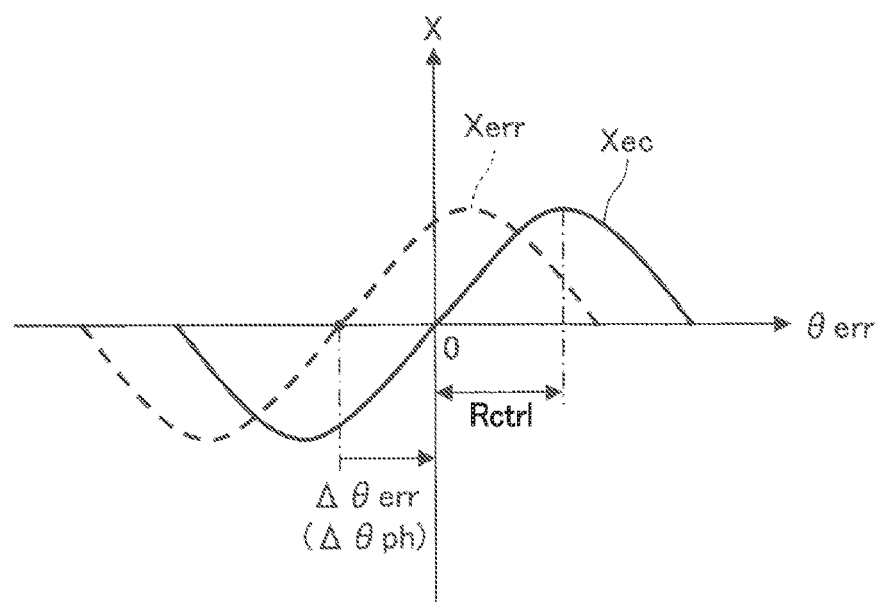
FIG. 8 is a graph of examples of the error parameter and the corrected error parameter.

FIG. 8 is a graph of examples of the error parameter Xerr and the corrected error parameter Xec. As illustrated in FIG. 8, a solid line denotes the corrected error parameter Xec, and a broken line denotes the error parameter Xerr.

In the case illustrated in FIG. 8, the zero-cross point of the error parameter Xerr is shifted by the angle error Δθerr. The phase of the error parameter Xerr is corrected by the angle error Δθerr to generate the corrected error parameter Xec whose zero-cross point coincides with zero on the coordinate axis representing the angle error Δθerr.

The estimation unit 48 estimates the actual rotator angle θre and an actual speed ωmre of the rotator 12 based on the corrected error parameter Xec. The actual speed ωmre is the actual speed of the rotator 12 presented in the mechanical angle. That is, the estimation unit 48 calculates the estimated rotator angle θest and the estimated speed ωmest.

Figure 9:
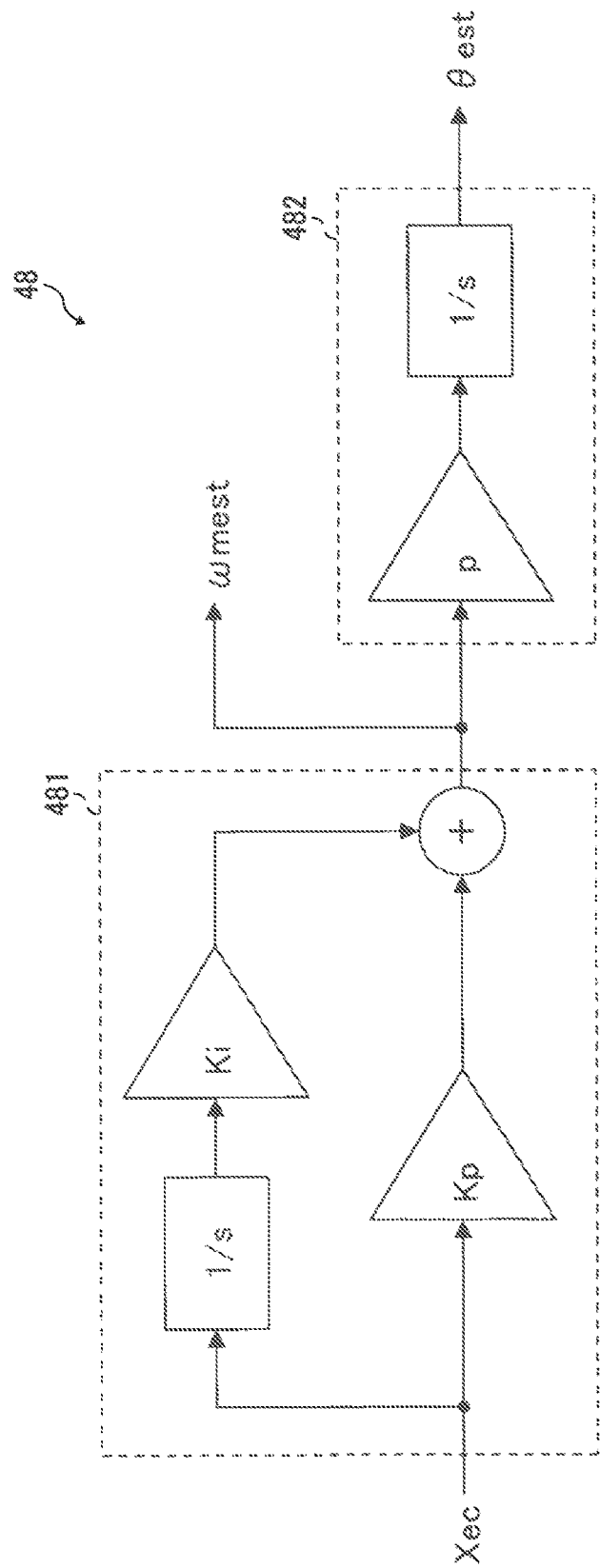
FIG. 9 is a schematic block diagram of an example of an estimation unit in the motor driving system illustrated in FIG. 1.

FIG. 9 is a schematic block diagram of an example of the estimation unit 48. The estimation unit 48 illustrated in FIG. 9 includes an error convergence unit 481 and an integration unit 482.

The error convergence unit 481 calculates and outputs the estimated speed ωmest by PI control so that the corrected error parameter Xec approaches zero. More specifically, the error convergence unit 481 outputs, as the estimated speed ωmest, a sum of a) a value obtained by multiplying the corrected error parameter Xec by a proportional gain Kp and b) a value obtained by integrating the corrected error parameter Xec (this action is represented as "1/s" in FIG. 9) and multiplying the integrated value by the integral gain Ki. The estimated speed ωmest output by the error convergence unit 481 is input to the speed control unit 41 and the integration unit 482.

The integration unit 482 calculates the estimated rotator angle θest based on the estimated speed ωmest. More specifically, the integration unit 482 multiplies the estimated speed ωmest by the number of bipolar pairs P, integrates (1/s) the multiplied value, and outputs the integrated value as the estimated rotator angle θest. This is because the estimated rotator angle θest is presented in the electrical angle while the estimated speed ωmest is presented in the mechanical angle. The estimated rotator angle θest is expressed by the following equation.

$$\theta est = p \cdot \int (\omega mest) dt \quad \text{Equation 10}$$

The integration unit 482 outputs the estimated rotator angle θest obtained by Equation 10. The estimated rotator angle θest output by the integration unit 482 is input to the first coordinate transformation unit 44 and the second coordinate transformation unit 45.

Action of the Motor Driving System

Next, an action of the motor driving system according to the present embodiment is described.

Figure 10:
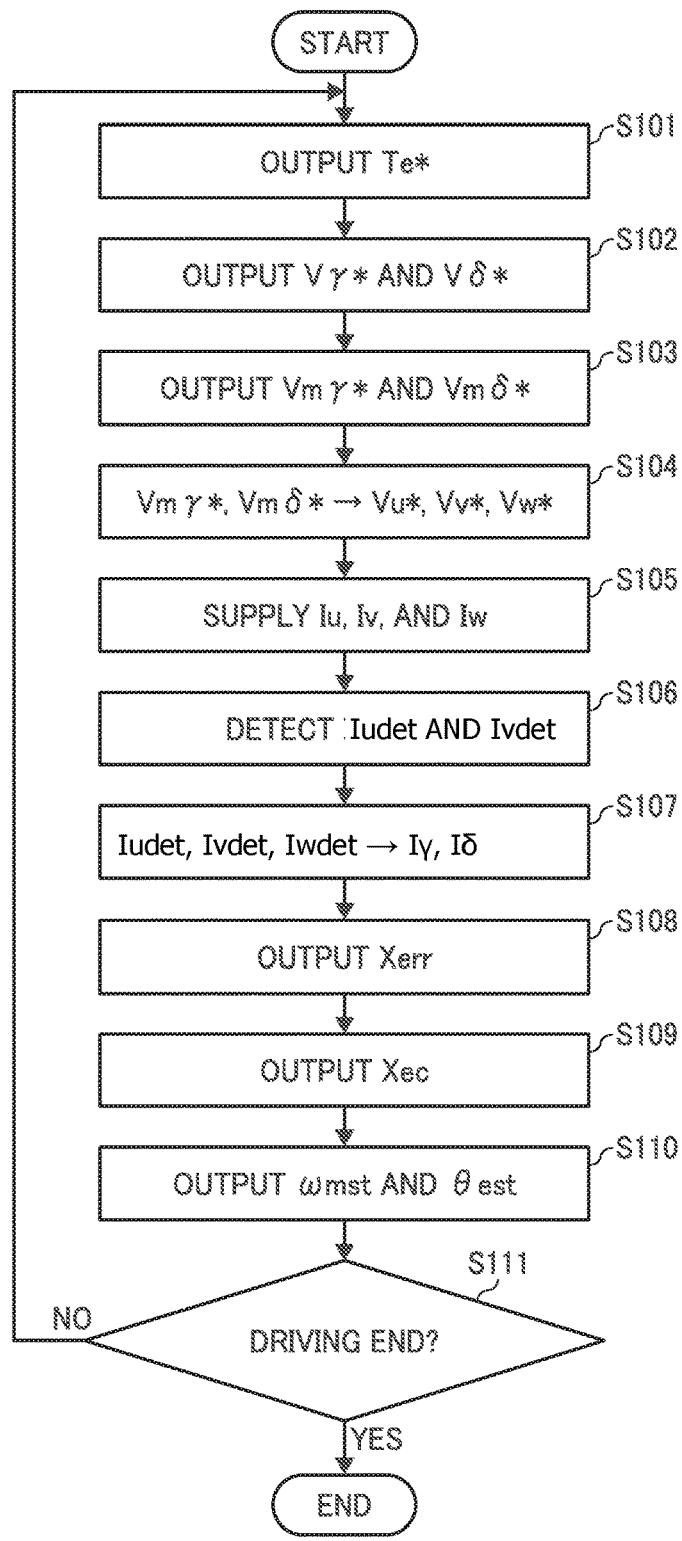
FIG. 10 is a flowchart of an example action of the motor driving system according to the first embodiment.

FIG. 10 is a flowchart of an example action of the motor driving system according to the present embodiment.

As the motor controller 4 starts the driving of the motor 1, the speed control unit 41 calculates the torque command value Te* so that the difference between the speed command value ωm* and the estimated speed ωmest becomes zero. Then, the speed control unit 41 outputs the torque command value Te* (step S101). The torque command value Te* output by the speed control unit 41 is input to the current control unit 42.

The current control unit 42 calculates the current command values Iγ* and Iδ* based on the torque command value Te*. The current control unit 42 calculates and outputs the voltage command values Vγ* and Vδ* so that the difference between the current command values Iγ* and the current values Iγ, and the difference between the current command values Iδ* and the current values Iδ becomes zero (step S102). The voltage command values Vγ* and Vδ* output by the current control unit 42 are input to the harmonic superimposition unit 43.

The harmonic superimposition unit 43 adds the harmonic command value Vγh* to the voltage command value Vγ* and adds the harmonic command value Vδh* to the voltage command value Vδ* to obtain the voltage command values Vmγ* and Vmδ*, respectively. The harmonic superimposition unit 43 outputs the voltage command values Vmγ* and Vmδ* (step S103). This step is equivalent to superimposing the harmonic voltage on the voltage applied to the coil 11. The voltage command values Vmγ* and Vmδ* output by the harmonic superimposition unit 43 are input to the first coordinate transformation unit 44. The phase ωct used in the calculations of the voltage command values Vmγ* and Vmδ* is input to the error parameter calculator 46.

The first coordinate transformation unit 44 performs the coordinate transformation on the voltage command values Vmγ* and Vmδ* from the γδ coordinate system to the UVW coordinate system to calculate and output the voltage command values Vu*, Vv*, and Vw* (step S104). The voltage command values Vu*, Vv*, and Vw* output by the first coordinate transformation unit 44 are input to the inverter 2.

The inverter 2 performs pulse-width modulation of the voltage command values Vu*, Vv*, and Vw* to generate the gating signals. The inverter 2 supplies the currents Iu, Iv, and Iw according to the voltage command values Vu*, Vv*, and Vw* to the three-phase coil 11 by turning on and off the switching elements of the driving circuit 22 with this gating signals (step S105). With the currents Iu, Iv, and Iw, the rotator 12 is rotated. In other words, the motor 1 is driven.

The current detector 3 detects the currents Iu and Iv flowing through the U-phase coil and the V-phase coil of the coil 11, and outputs the current values Iudet and Ivdet (step S106). The current values Iudet and Ivdet output by the current detector 3 are input to the second coordinate transformation unit 45.

The second coordinate transformation unit 45 calculates a current value Iwdet of the current Iw, from the current values Iudet and Ivdet. The second coordinate transformation unit 45 performs the coordinate transformation on the current values Iudet, Ivdet, and Iwdet from the UVW coordinate system to the γδ coordinate system to calculate and output the current values Iγ, and Iδ (step S107). The current values Iγ and Iδ output by the second coordinate transformation unit 45 are input to the current control unit 42 and the error parameter calculator 46.

The error parameter calculator 46 calculates the error current values Iγerr and Iδerr based on the current values Iγ and Iδ, and the phase ωct and outputs the error current values Iγerr and Iδerr (step S108). As described above, the error current value Iδerr is equivalent to the error parameter Xerr. The error current values Iγerr and Iδerr output by the error parameter calculator 46 are input to the correction unit 47.

The correction unit 47 corrects the phase of the error parameter Xerr by the phase-corrected amount Δθph. The correction unit 47 calculates the corrected error parameter Xec based on the error current values Iγerr and Iδerr (step S109). The corrected error parameter Xec calculated by the correction unit 47 is input to the estimation unit 48.

The estimation unit 48 calculates and outputs the estimated speed ωmest so that the corrected error parameter Xec approaches zero. The estimated speed ωmest output by the estimation unit 48 is input to the speed control unit 41. The estimation unit 48 calculates and outputs the estimated rotator angle θest based on the estimated speed ωmest (step S110). The estimated rotator angle θest output by the estimation unit 48 is input to the first coordinate transformation unit 44 and the second coordinate transformation unit 45.

The motor driving system repeats the processes from steps S101 to S110 until the driving of the motor 1 ends ("NO" at step S111).

As described above, in the present embodiment, the phase of the error parameter Xerr is corrected. In the present embodiment, even when the angle error Δθerr of the error parameter Xerr occurs due to the characteristics or the driving condition of the motor 1, the phase of the error parameter Xerr is corrected to approximate the zero-cross point to zero (Δδerr=0). Thus, controlling an influence of the angle error Δθerr, the angle and the speed of the rotator 12 can be estimated accurately. The motor 1 can be controlled accurately by using the angle and the speed estimated with high accuracy.

The error parameter Xerr may be corrected in an amplitude direction to correct the error parameter Xerr.

Figure 11:
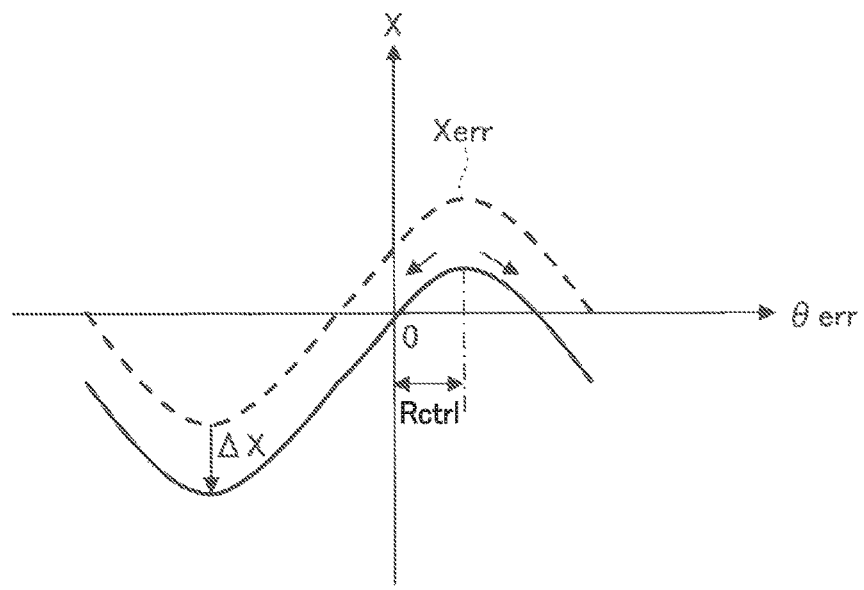
FIG. 11 is a graph illustrating a comparative correction method.

FIG. 11 is a graph illustrating such a correction method as a comparative example. As illustrated in FIG. 11, a broken line denotes the error parameter Xerr, and a solid line denotes the error parameter Xerr corrected by the comparative correction method.

In the comparative correction method as illustrated in FIG. 11, when the zero-cross point of the error parameter Xerr deviates from zero, the error parameter Xerr is corrected by an amplitude corrected amount ΔX in the amplitude direction. In this correction method, the zero-cross point of the error parameter Xerr can be approximated to zero in the same manner as the present embodiment.

However, when the error parameter Xerr is corrected in the amplitude direction, a slope of the error parameter Xerr being a function becomes mild in the vicinity of zero as illustrated in FIG. 11. As a result, a PI control loop gain to estimate the angle and the speed is lowered.

On the other hand, in the present embodiment, when the error parameter Xerr is corrected, a slope of the error parameter Xerr being a function does not become mild in the vicinity of zero as illustrated in FIG. 8. Therefore, in the present embodiment, the PI control loop gain and a response speed can be improved compared with the comparative correction method.

In the comparative correction method, suppressing a peak deviation of the error parameter Xerr is difficult. Thus, a controllable range Rctrl of the angle error θerr (either positive or negative), in which the angle error θerr can follow an adequate zero-cross point, become narrow. For example, in the case illustrated in FIG. 11, the positive controllable range Rctrl is narrower than that in a case where the zero-cross point of the error parameter Xerr is zero. As a result, the angle error θerr is likely to exceed the controllable range Rctrl due to disturbances, to make the control of the motor 1 unstable.

On the other hand, in the present embodiment, as illustrated in FIG. 8, the peak deviation of the error parameter Xerr is suppressed to widen the controllable range Rctrl. Therefore, the control of the motor 1 is stable compared with the comparative correction method.

Both the correction method according to the present embodiment (phase correction) and the above-mentioned comparative correction method (amplitude correction) may be used concurrently.

The error parameter Xerr is not limited to the error current value Iδerr. The error parameter Xerr may be any parameter proportional to the angle error θerr in the vicinity of zero in the case where the angle error Δθerr is zero. The error parameter Xerr is not limited to the sine wave like the error current value Iδerr, but may be a sawtooth wave and the like.

Figure 12:
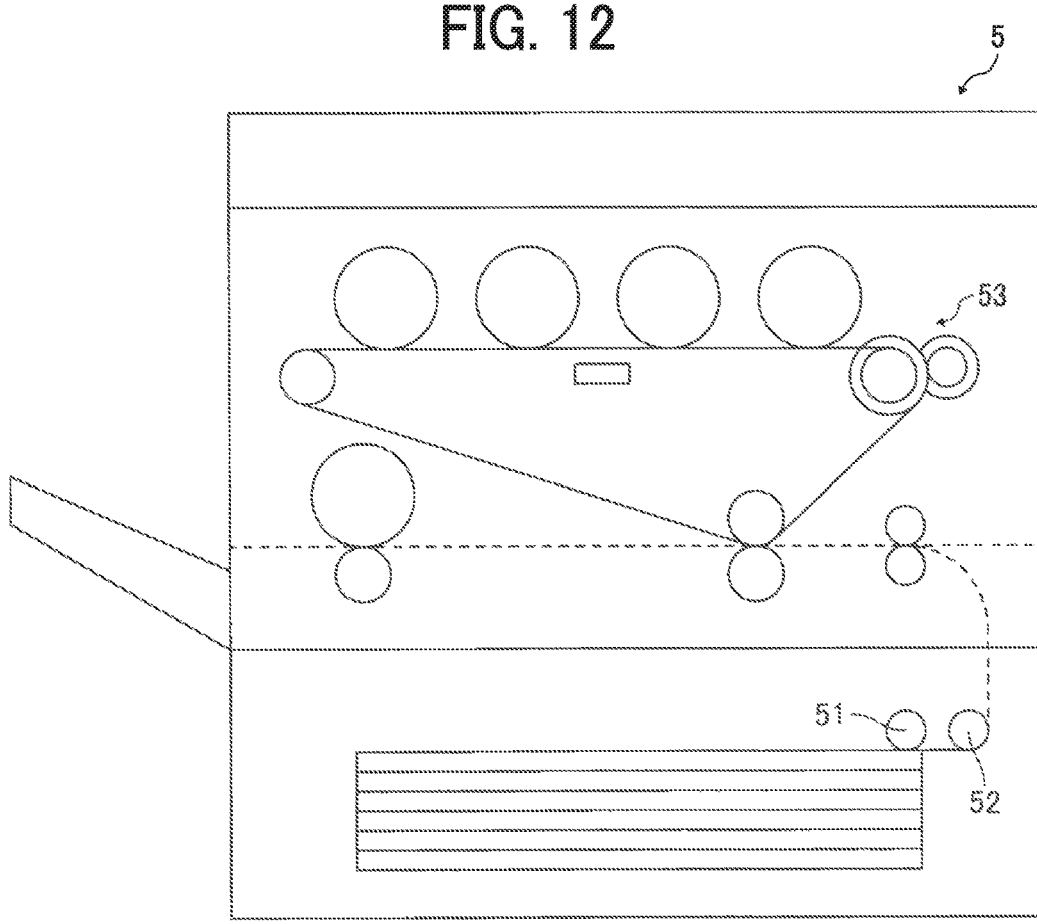
FIG. 12 is a schematic view of an example of an image forming apparatus according to the first embodiment.

FIG. 12 is a schematic view of an example of an image forming apparatus.

An image forming apparatus 5 illustrated in FIG. 12 has a printing function and includes an image forming device 53 to form an image on a sheet (i.e., a recording medium). The image forming apparatus 5 may include a scanner function, or a facsimile function, and the like. The image forming apparatus 5 includes rollers like a feed roller 51 and a conveyance roller 52 to convey the sheet, and the like. The motor driving system according to the present embodiment can be used as the driving system of the motor to drive these rollers.

Figure 13:
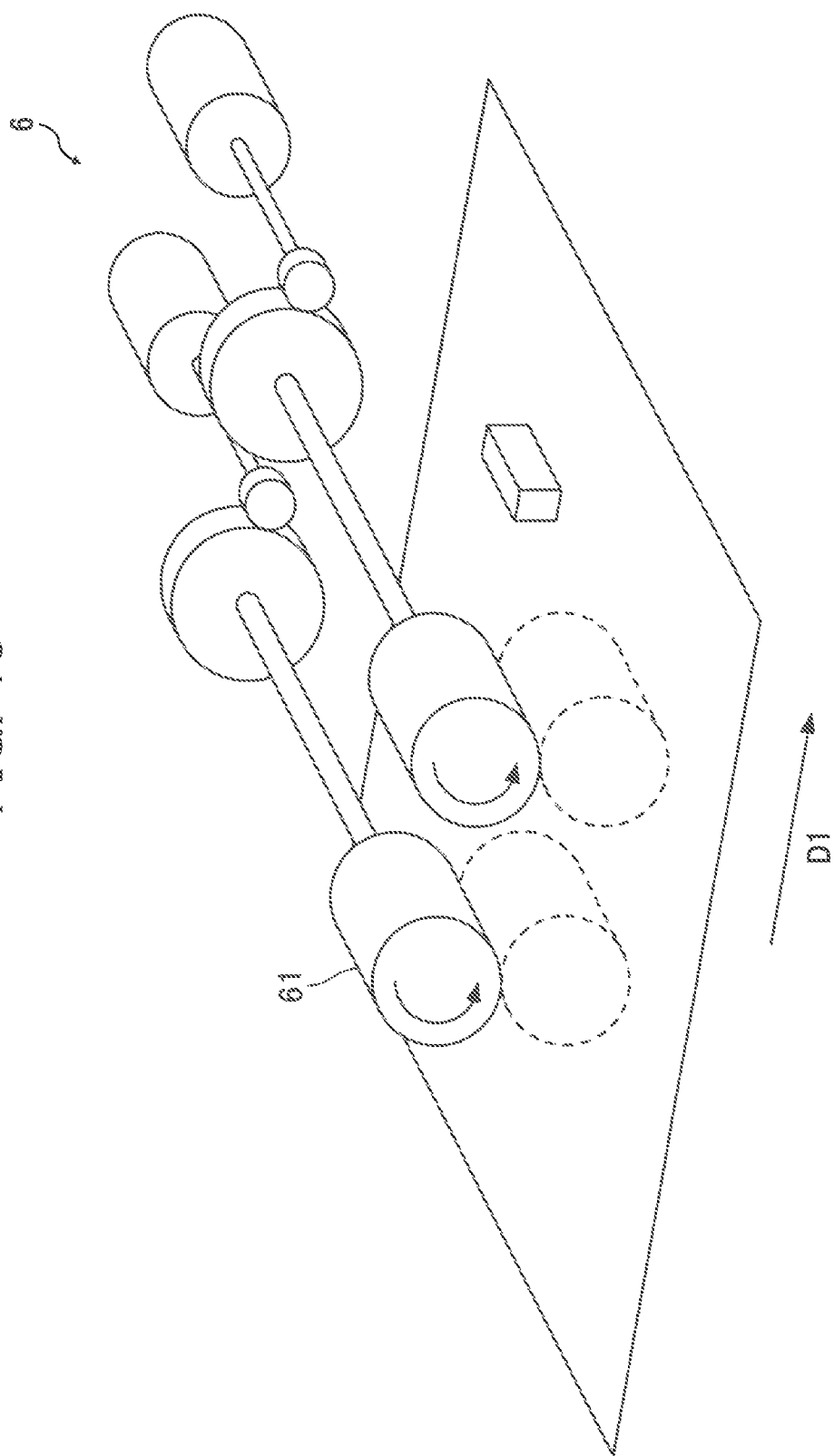
FIG. 13 is a perspective view of an example of a conveyance device according to the first embodiment.

FIG. 13 is a perspective view of an example of a conveyance device 6.

The conveyance device 6 illustrated in FIG. 13 is any device to convey a sheet-like object, such as a paper sheet, a bill, or a prepreg. The conveyance device 6 may be employed in the image forming apparatus 5. The conveyance device 6 includes a conveyance roller 61 to convey the object in a conveyance direction indicated by arrow DI. The motor driving system according to the present embodiment can be used as the driving system of the motor to drive these rollers.

The motor driving system according to the present embodiment is not limited to those used in the image forming apparatus 5 or the conveyance device 6, and may be used in any apparatus which employs a stepping motor, such as a car, a robot, or an amusement machine.

Descriptions are given below of a motor driving system according a second embodiment with reference to FIG. 14. In the present embodiment, a motor driving system that drives a stepping motor is described.

Figure 14:
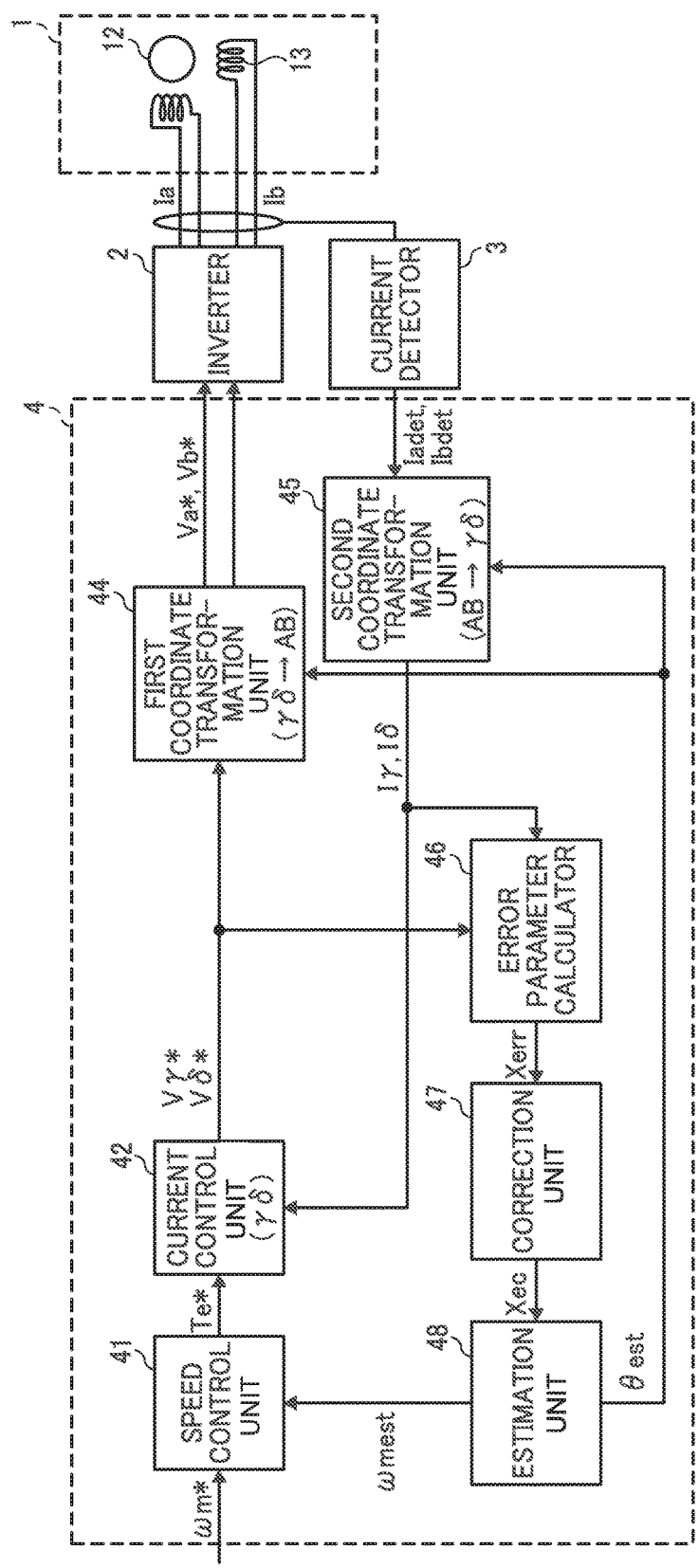
FIG. 14 is a schematic block diagram illustrating a configuration of the motor driving system according to the second embodiment.

FIG. 14 is a schematic block diagram illustrating a configuration of the motor driving system according to the present embodiment. The motor driving system in FIG. 14 includes a motor 1, the inverter 2, the current detector 3, and the motor controller 4. Descriptions are given below of the second embodiment, focusing on the differences from the above-described first embodiment.

The motor 1 is a two-phase stepping motor. Respective phases of the motor 1 are called as a phase A and a phase B. The motor 1 includes a two-phase coil 13 (stator) and the rotator 12. Currents Ia and Ib are supplied from the inverter 2 to an A-phase coil and a B-phase coil of the coil 13 in the motor 1, respectively. The rotator 12 in the motor 1 rotates according to a magnetic field generated by the A-phase coil and the B-phase coil of the coil 13 in response to the currents Ia and Ib.

The inverter 2 supplies the motor 1 with the currents Ia and Ib according to voltage command values Va* and Vb* output by the motor controller 4, thereby driving the motor 1. The voltage command values Va* and Vb* are the voltage command values applied to the A-phase coil and the B phase coil of the coil 13, respectively. The configuration of the inverter 2 of the second embodiment is similar to that of the first embodiment except that a two-phase configuration is used.

The current detector 3 detects the currents Ia and Ib flowing through the A-phase coil and B-phase coil of the coil 13, respectively, and outputs the current values Iadet and Ibdet. The current values Iadet and Ibdet output by the current detector 3 are input to the second coordinate transformation unit 45. The configuration of the current detector 3 of the second embodiment is similar to that of the first embodiment.

In the present embodiment, the motor controller 4 estimates the angle and the speed of the rotator 12 by using an induced voltage generated by the rotation of the rotator 12. For this reason, the motor controller 4 does not include the harmonic superimposition unit 43. The voltage command values Vγ* and Vδ* output by the current control unit 42 are input to the first coordinate transformation unit 44. The first coordinate transformation unit 44 and the second coordinate transformation unit 45 perform coordinate transformations between γδ coordinate system and AB coordinate system because the motor 1 is a two-phase stepping motor. The error parameter Xerr and the corrected error parameter Xec of the second embodiment are differ from those of the first embodiment.

The first coordinate transformation unit 44, the second coordinate transformation unit 45, the error parameter calculator 46, and the correction unit 47 are described below. Other configurations of the second embodiment are similar to those of the first embodiment.

The first coordinate transformation unit 44 transforms the γδ coordinate system to the AB coordinate system based on the estimated rotator angle θest. The first coordinate transformation unit 44 performs the coordinate transformation on the voltage command values Vγ* and Vδ* to calculate and output the voltage command values Va* and Vb*. The voltage command values Va* and Vb* output by the first coordinate transformation unit 44 are input to the inverter 2.

The second coordinate transformation unit 45 transforms the AB coordinate system to the γδ coordinate system based on the estimated rotator angle θest. The second coordinate transformation unit 45 performs the coordinate transformation on the current values Ia and Ib to calculate and output the current values Iγ and Iδ. The current values Iγ and Iδ output by the second coordinate transformation unit 45 are input to the current control unit 42 and the error parameter calculator 46.

By using the estimated rotator angle θest, a transformation matrix R, which performs the coordinate transformation from the AB coordinate system to the γδ coordinate system, is expressed by the following equation.

$$R = \begin{bmatrix} \cos\theta est & -\sin\theta est \\ \sin\theta est & \cos\theta est \end{bmatrix} \quad \text{Equation 11}$$

The first coordinate transformation unit 44 calculates the voltage command values Va* and Vb* by the following equation using the transformation matrix R.

$$\begin{bmatrix} Va* \\ Vb* \end{bmatrix} = R^T \begin{bmatrix} V\gamma* \\ V\delta* \end{bmatrix} \quad \text{Equation 12}$$

The second coordinate transformation unit 45 calculates the current values Iγ and Iδ by the following equation using the transformation matrix R.

$$\begin{bmatrix} I\gamma \\ I\delta \end{bmatrix} = R \begin{bmatrix} Ia \\ Ib \end{bmatrix} \quad \text{Equation 13}$$

The error parameter calculator 46 estimates the angle error using the induced voltage generated by the rotation of the rotator 12. An estimation method using the induced voltage is preferably used for a medium to high speed driving of the motor 1. The estimation method using an extended induced voltage is known as the estimation method of the angle error using the induced voltage for example. In this estimation method, an extended induced voltage model expressed by the following equations is used.

$$\begin{bmatrix} V\gamma* \\ V\delta* \end{bmatrix} = \begin{bmatrix} R+\rho\cdot Ld & -p\cdot\omega mre\cdot Lq \\ \omega mre\cdot Lq & R+\rho\cdot Ld \end{bmatrix} \begin{bmatrix} I\gamma \\ I\delta \end{bmatrix} + \begin{bmatrix} e\gamma \\ e\delta \end{bmatrix} \quad \text{Equation 14}$$

$$\begin{bmatrix} e\gamma \\ e\delta \end{bmatrix} = Eex\cdot\begin{bmatrix} -\sin(\theta err+\Delta\theta err) \\ \cos(\theta err+\Delta\theta err) \end{bmatrix} + p(\omega mest-\omega mre)Ld\begin{bmatrix} -I\gamma \\ I\delta \end{bmatrix} \quad \text{Equation 15}$$

$$Eex = p\cdot\omega mre\{(Ld-Lq)Id+\Psi a\} - (Ld-Lq)\rho\cdot Iq \quad \text{Equation 16}$$

In Equations 14 to 16, R represents a coil resistance value, Ld represents a d-axis component of an inductance, and Ψa represents a flux linkage by the rotator 12. These parameters are determined by the characteristics of the motor 1. Additionally, ρ is a differential operator, p is the number of the bipolar pairs, eγ is a γ-axis component of the induced voltage, eδ is a δ-axis component of the induced voltage, and Eex is the extended induced voltage.

When the motor 1 rotates at the constant speed, the estimated speed ωmest is nearly equal to the actual speed ωmre, and the current values Iγ and Iδ are nearly constant, Equation 15 is simplified in terms of the sine function and cosine function to obtain the following equation.

$$\begin{bmatrix} \sin(\theta err+\Delta\theta err) \\ -\cos(\theta err+\Delta\theta err) \end{bmatrix} \cong \frac{1}{\omega mre\Psi a}\begin{bmatrix} V\delta* - R\cdot I\delta + \omega mre\cdot Lq\cdot I\gamma \\ V\gamma* - R\cdot I\gamma + \omega mre\cdot Lq\cdot I\delta \end{bmatrix} \quad \text{Equation 17}$$

In the present embodiment, the sine function sin(θerr+Δθerr) in Equation 17 is equivalent to the error parameter Xerr. The error parameter calculator 46 can calculate Equation 17 to calculate the error parameter Xerr. As the actual speed ωmre in Equation 17 is not obtained, the error parameter calculator 46 substitutes the speed command value ωm* or the estimated speed ωmest for the actual speed ωmre to calculate Equation 17.

The error parameter calculator 46 outputs the above-mentioned values of the sine function (the error parameter Xerr) and cosine function. The values output by the error parameter calculator 46 are input to the correction unit 47.

The correction unit 47 corrects the phase of the error parameter Xerr by the predetermined phase-corrected amount Δθph. When the phase-corrected amount Δθph is sufficiently close to the angle error Δθerr, the corrected error parameter Xec is expressed by the following equation.

$$Xec = \begin{bmatrix} \sin(\Delta\theta ph) \\ \cos(\Delta\theta ph) \end{bmatrix}^T \begin{bmatrix} \sin(\theta err + \Delta\theta err) \\ -\cos(\theta err + \Delta\theta err) \end{bmatrix} \cong \sin(\theta err) \quad \text{Equation 18}$$

As expressed in Equations 17 and 18, the corrected error parameter Xec is equivalent to the error parameter Xerr shifted in phase by the angle error Δθerr (phase-corrected amount Δθph). The correction unit 47 outputs the corrected error parameter Xec obtained in this manner. The corrected error parameter Xec output by the correction unit 47 is input to the estimation unit 48.

In the present embodiment, the above-mentioned configuration, in which the motor 1 is two-phase stepping motor, can control the motor 1 in the same manner as the first embodiment. Therefore, a similar effect like the first embodiment can be achieved thereby.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An angle estimator comprising:
   correction means for correcting a phase of an error parameter to obtain a corrected error parameter, the error parameter being a function of an angle error representing a difference between an actual angle of a motor and an estimated angle of the motor; and
   estimation means for calculating an estimated speed and an estimated angle of the motor based on the corrected error parameter.

2. The angle estimator according to claim 1, wherein the correction means is configured to correct the error parameter to bring a zero-cross point of the error parameter closer to zero on a coordinate axis representing the angle error, to obtain the corrected error parameter.

3. The angle estimator according to claim 1, wherein the corrected error parameter is proportional to the angle error in a vicinity of zero.

4. The angle estimator according to claim 1 wherein the error parameter is a sine function of the angle error.

5. The angle estimator according to claim 1, further comprising:
   an electrical current detector to detect an electrical current supplied to the motor; and
   an error parameter calculator configured to calculate the error parameter based on a value of the electrical current detected by the electrical current detector.

6. A motor controller comprising:
   the angle estimator according to claim 1; and
   control means for calculating a voltage command value to make the estimated speed accord with a speed command value instructing a speed of the motor, the voltage command value instructing a value of voltage to drive the motor.

7. A motor driver comprising:
   the motor controller according to claim 6;
   an inverter to supply the motor with an electrical current according to the voltage command value; and
   an electrical current detector to detect an electrical current supplied to the motor.

8. A motor driving system comprising:
   the motor; and
   the motor driver according to claim 7, to drive the motor.

9. An image forming apparatus comprising:
   an image forming device to form an image on a sheet;
   a conveyance roller to convey the sheet; and
   the motor driving system according to claim 8, to drive the conveyance roller.

10. A conveyance device comprising:
    a conveyance roller to convey a sheet; and
    the motor driving system according to claim 8, to convey the sheet.

11. An angle estimator comprising circuitry configured to:
    correct a phase of an error parameter to obtain a corrected error parameter, the error parameter being a function of an angle error representing a difference between an actual angle of a motor and an estimated angle of the motor; and
    calculate an estimated speed and an estimated angle of the motor based on the corrected error parameter.

12. The angle estimator according to the claim 11, wherein the circuit is configured to correct the error parameter to bring a zero-cross point of the error parameter closer to zero on a coordinate axis representing the angle error, to obtain the corrected error parameter.

13. The angle estimator according to the claim 11, wherein the corrected error parameter is proportional to the angle error in a vicinity of zero.

14. The angle estimator according to the claim 11 wherein the error parameter is a sine function of the angle error.

15. A motor controlling method comprising:
    the angle estimating method according to claim 11; and
    calculating a voltage command value to make the estimated speed accord with a speed command value representing a speed command value instructing a speed of the motor, the voltage command value instructing a value of voltage to drive the motor.

16. An angle estimating method comprising:
  correcting a phase of an error parameter to obtain a corrected error parameter, the error parameter being a function of an angle error representing a difference between an actual angle of a motor and an estimated angle of the motor; and
  calculating an estimated speed and an estimated angle of the motor based on the corrected error parameter.

17. The angle estimating method according to claim 16, wherein the correcting includes correcting the error parameter to bring a zero-cross point of the error parameter closer to zero on a coordinate axis representing the angle error.

18. The angle estimating method according to claim 16, wherein the corrected error parameter is proportional to the angle error in a vicinity of zero.

19. The angle estimating method according to claim 16, wherein the error parameter is a sine function of the angle error.

20. The angle estimating method according to claim 16, further comprising:
  detecting an electrical current supplied to the motor; and
  calculating the error parameter based on a detected value of the electrical current.

* * * * *